United States Patent
Sawa et al.

(10) Patent No.: US 6,676,518 B1
(45) Date of Patent: Jan. 13, 2004

(54) IMAGE GENERATING DEVICE, AN IMAGE GENERATING METHOD, A READABLE STORAGE MEDIUM STORING AN IMAGE GENERATING PROGRAM AND A VIDEO GAME SYSTEM

(75) Inventors: Shinji Sawa, Kobe (JP); Eiji Nakagawa, Kakogawa (JP)

(73) Assignee: Konami Corporation, Tokyo-to (JP)

( * ) Notice: Subject to any disclaimer, the term of this patent is extended or adjusted under 35 U.S.C. 154(b) by 0 days.

(21) Appl. No.: 09/621,752

(22) Filed: Jul. 24, 2000

(30) Foreign Application Priority Data

Jul. 26, 1999 (JP) .......................... 11-211013

(51) Int. Cl.⁷ ................................. A63F 9/24
(52) U.S. Cl. ........................... 463/31; 463/43
(58) Field of Search .................. 463/1–5, 31–34, 463/37–38, 43–44; 345/419, 426, 473, 530, 551, 589, 581, 643, 952

(56) References Cited

U.S. PATENT DOCUMENTS

| | | | |
|---|---|---|---|
| 4,600,200 A | | 7/1986 | Oka et al. |
| 5,255,353 A | * | 10/1993 | Itoh .......................... 345/426 |
| 5,435,554 A | * | 7/1995 | Lipson ........................ 463/3 |
| 5,555,353 A | * | 9/1996 | Shibazaki .................. 345/426 |
| 5,616,031 A | | 4/1997 | Logg |
| 5,720,020 A | | 2/1998 | Tannenbaum et al. |
| 5,793,376 A | | 8/1998 | Tanaka et al. |
| 5,870,101 A | | 2/1999 | Murata et al. |
| 5,947,823 A | | 9/1999 | Nimura |
| 6,017,272 A | | 1/2000 | Rieder |
| 6,141,014 A | | 10/2000 | Endo et al. |
| 6,203,431 B1 | * | 3/2001 | Miyamoto et al. .......... 463/31 |

FOREIGN PATENT DOCUMENTS

| | | |
|---|---|---|
| EP | 0758117 | 2/1997 |
| EP | 0916374 | 5/1999 |
| JP | 04205275 | 7/1992 |
| JP | 4-205275 | 7/1992 |
| JP | 6-103361 | 4/1994 |
| JP | 7-129796 | 5/1995 |
| JP | 9-047576 | 2/1997 |
| JP | 09047576 | 2/1997 |
| JP | 10134205 | 5/1998 |
| JP | 10-134205 | 5/1998 |
| JP | 11144077 | 5/1999 |
| JP | 11-144077 | 5/1999 |
| TW | 87118509 | 2/1999 |
| TW | 324082 | 11/1999 |
| WO | WO96/25211 | 8/1996 |
| WO | WO98/48381 | 10/1998 |

OTHER PUBLICATIONS

"Real time broadcasting of the world cup of football game—World Cup France '98–", Weekly Fami–Tsu, Japan, Kabushiki Kaisha ASCII, published on Jun. 19, 1998, vol. 13, No. 25, p. 40.

Lary L. Myers, "a trick in programming for 3D games" Japan, Kabushiki Kaisha Softbank, published on Jul. 10, 1998, pp. 123 to 126, 231, 232.

* cited by examiner

*Primary Examiner*—Kim Nguyen
(74) *Attorney, Agent, or Firm*—Jordan and Hamburg LLP

(57) ABSTRACT

A game progress control device administers positions of player characters and a referee using positions corresponding to their waists. A shadow image generating device generates shadow images of all the player characters and the referee character who appear on the screen of the monitor. A density setting device sets the density of each shadow based image based on the position of the appearing character on a soccer field using an x-coordinate of his waist. Accordingly, the shadow images of specified densities belonging to the individual appearing characters can be generated by simple calculation.

9 Claims, 15 Drawing Sheets

IMAGE GENERATING DEVICE, AN IMAGE GENERATING METHOD, A READABLE STORAGE MEDIUM STORING AN IMAGE GENERATING PROGRAM AND A VIDEO GAME SYSTEM

The present invention relates to an image generating device using an optical disk, a magnetic disk, a semiconductor memory or like storage medium storing a program data, an image generating method, a readable storage medium storing an image generating program and a video game system.

BACKGROUND OF THE INVENTION AND RELATED ART STATEMENT

Quite a few video game systems have been proposed. These video systems include systems comprised of a special apparatus for home use and a television monitor and systems comprised of a special apparatus for commercial use, a personal computer or a workstation, a display and a sound output device. Any one of these systems is provided with a controller operated by a game player, a storage medium storing a game program data, a CPU for executing controls to generate sounds and images based on the game program data, an image processor for generating images, an audio processor for generating sounds, a CRT monitor for displaying images, and a loudspeaker for making the sounds audible. CD-ROMs, semiconductor memories, cassettes containing built-in semiconductor memories, etc. are frequently used as the storage medium.

Various kinds of video games of this type are known. Among these known games, competition video games in which many player characters are displayed to play a game on a monitor screen, e.g. a soccer game are known. The soccer game is played by giving instructions of specific motions such as dribble, pass and shoot to a player character of an own team through a controller, and can be said to be an interesting video game having high gaming nature and competition nature.

In such a soccer game, a night game can be expressed in a realistic manner by generating shadow images belonging to player characters and displaying them on the field.

In competition games such as soccer games, many characters including player characters and a referee character need to simultaneously appear on the screen and to be relatively quickly motioned. Accordingly, it has been difficult to generate the character images and shadow images thereof in real time by performing a light source calculation from illumination lights set in specified positions because calculation processing is excessively loaded.

SUMMARY OF THE INVENTION

In view of the above problem residing in the prior art, an object of the present invention is to provide image generating device and method which can generate shadow images of specified density for individual characters who appear on a screen by simple calculation, a readable storage medium storing an image generation program and a video game system.

In order to achieve the objects according to the invention, an image generating device comprises: a shadow image generation control means for generating the shadow image belonging to the character located on the simulated field set in the virtual 3D space and extending at least in one direction; a density setting means for setting a density of the shadow image based on a position of the character on the simulated field; a display means for displaying the shadow image; and a display control means for displaying the generated shadow image at the set density on the display means.

These and other objects, features and advantages of the present invention will become more apparent upon reading of the following detailed description along with the accompanied drawings.

DETAILED DESCRIPTION OF THE PREFERRED EMBODIMENTS OF THE INVENTION

Figure 1:
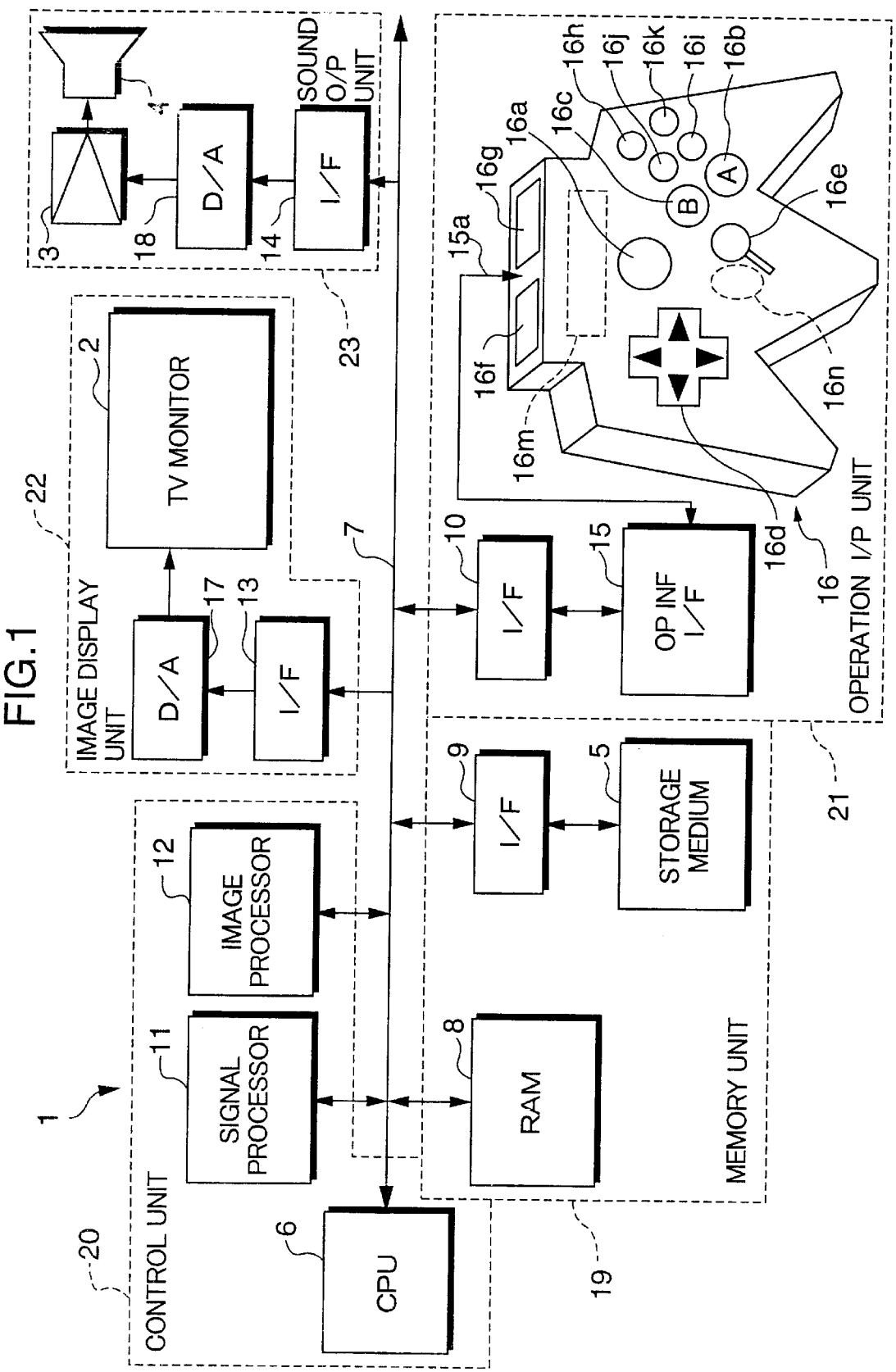
FIG. 1 is a block diagram showing a game system according to one embodiment of an inventive video game system.

FIG. 1 is a block diagram of a video game system 1 according to one embodiment of an inventive video game system.

A video game system 1 is comprised of a main game unit, a television monitor (hereinafter, merely "monitor") 2 as a display means for outputting images of a game, an amplifying circuit 3 and a loudspeaker 4 for outputting sounds of the game, and a storage medium 5 storing a game data including image data, sound data and a program data. The storage medium 5 is, for example, a so-called ROM cassette in which a ROM or the like storing the game data, a program data of an operating system is contained in a plastic casing, an optical disk, or a flexible disk.

The main game unit is constructed by connecting a bus 7 comprised of an address bus, a data bus and a controller bus to a CPU 6, connecting a RAM 8, interface circuits 9 and 10, a signal processor 11, an image processor 12, and interface circuits 13 and 14 to the bus 7, respectively, connecting a controller 16 to the interface circuit 10 via an operational information interface circuit 15, connecting a digital-to-analog (D/A) converter 17 to the interface circuit 13 and connecting a D/A converter 18 to the interface circuit 14.

A memory unit 19 is constructed by the RAM 8, the interface circuit 9 and the storage medium 5. A control unit 20 for controlling the progress of the game is constructed by the CPU 6, the signal processor 11 and the image processor 12. An operational input unit 21 is constructed by the interface circuit 10, the operational information interface circuit 15 and the controller 16. An image display unit 22 is constructed by the monitor 2, the interface circuit 13 and the D/A converter 17. A sound output unit 23 is constructed by the amplifying circuit 3, the loudspeaker 4, the interface circuit 14 and the D/A converter 18.

In the case that the storage medium 5 is, for example, a ROM cassette, the RAM 8 may be integrally accommodated in the plastic case of the storage medium 5.

The signal processor 11 is mainly adapted for the calculation in a three-dimensional (3D) space, the calculation to transform a position in the 3D space into the one in a simulated 3D space, the light source calculation, and the generation and processing of sound data.

The image processor 12 is adapted to write an image data in the RAM 8 in accordance with the calculation result of the signal processor 11: for example, to write a texture data in an area of the RAM 8 designated by a polygon.

The controller 16 functions as an operable means operated by a game player and includes a start button 16a, an A-button 16b, a B-button 16c, a cross key 16d, a stick-shaped controller 16e, a left trigger button 16f, a right trigger button 16g, a C1-button 16h, a C2-button 16i, a C3-button 16j, a C4-button 16k, and a back (rear) trigger button 16n.

The controller 16 also includes a connector 16m, and a card memory (not shown) made of a nonvolatile memory for, e.g. temporarily storing the progress of the game when the game is interrupted, and the like are detachably connectable with the connector 16m.

The stick-shaped controller 16e has substantially the same functions as a joystick. Specifically, the stick-shaped controller 16e includes a standing stick and is operable not only to up, down left and right, but in any direction of 360° about a specified position where the stick stands. According to a direction of inclination and an angle of inclination of the stick, values in X-coordinate (lateral direction) and Y-coordinate (forward and backward directions) with the standing position as an origin are sent to the CPU 6 via the interface circuits 15, 10.

This game system 1 has different modes depending upon its application. More specifically, if the game system 1 is constructed to be used at home, the monitor 2, the amplifying circuit 3 and the loudspeaker 4 are separate from the main game unit. If the game system 1 is constructed to be used on a commercial basis, all the parts shown in FIG. 1 are accommodated as a unit in a signal container.

Further, if the game system 1 is constructed using a personal computer or a workstation as a core, the monitor 2 corresponds to a display of the computer; the image processor 12 corresponds to a part of the game program data stored in the storage medium 5 or a hardware on an extension board mounted on an extension slot of the computer; and the interface circuits 9, 10, 13, 14, the D/A converters 17, 18 and the operational information interface circuit 15 correspond to the hardware on the extension board mounted on the extension slot of the computer. Further, the RAM 8 corresponds to a main memory of the computer or the respective areas of an extension memory. In this embodiment, an example in which the game system 1 is constructed to be used at home is described.

Next, the operation of the game system 1 is schematically described. A power switch (not shown) is turned on to apply a power to the game system 1. At this time, the CPU 6 reads image data, sound data and game program data from the storage medium 5 in accordance with an operating system stored in the storage medium 5. A part or all of the read image data, sound data and game program data are stored in the RAM 8.

Thereafter, the CPU 6 progresses a game based on the game program data stored in the RAM 8 and contents of instructions given from a game player via the controller 16. In other words, the CPU 6 suitably generates commands as tasks to output images and sounds based on the contents of instructions given from the game player via the controller 16.

The signal processor 11 performs the calculation of positions of characters in the 3D space (the same applies to the two-dimensional (2D) space), the light source calculation, the sound data generation and processing based on the above commands.

Subsequently, the image processor 12 writes an image data to be imaged in a display area of the RAM 8 based on the calculation result. The image data written in the RAM 8 is fed via the interface circuit 13 to the D/A converter 17, where it is converted into an analog video signal and then fed to the monitor 2 to be displayed on its display surface as an image.

On the other hand, the sound data outputted from the signal processor 11 is fed via the interface circuit 14 to the D/A converter 18, where it is converted into an analog sound signal and then outputted as sounds from the loudspeaker 4 via the amplifying circuit 3.

Next, the writing of the texture data by the image processor 12 is described with reference to FIG. 1.

As described above, the signal processor 11 performs the calculation based on the command of the CPU 6, and the image processor 12 writes the image data in the display area of the RAM 8 based on the calculation result.

The RAM 8 has a non-display frame and a display frame (frame buffer), and polygon data, texture designation data and color data (texture data) and other data stored in the storage medium 5 are stored in the non-display area.

Here, polygons are polygonal 2D virtual figures for constructing objects set in a game space, i.e. models and characters. In this embodiment, the polygons are triangular and rectangular. Textures are 2D images to be pasted to the polygons to construct an image, whereas color data are data for designating the colors of the textures.

The polygon data which are coordinate data of apices of the polygons and the texture designation data for designating the textures corresponding to the polygons are stored together.

Imaging commands generated by the CPU 6 include commands for forming a 3D image using polygons and commands for forming usual 2D images.

The imaging command to form a 3D image using the polygons is comprised of polygon apex address data in the non-display area of the RAM 8, texture address data representing stored positions of texture data to be pasted to the polygons in the RAM 8, color address data representing stored positions of color data indicating the colors of the texture data in the display area of the RAM 8, and luminance data representing the luminance of the textures.

Among these data, the polygon apex address data are obtained as follows. The signal processor 11 applies coordinate transformation and perspective transformation to polygon apex coordinate data in the 3D space from the CPU 6 based on a moving amount data and a rotating amount data of the screen itself (visual point), thereby replacing it by polygon apex coordinate data in the 2D space.

The polygon apex coordinate data in the 2D space represents the addresses in the display area of the RAM 8, and the image processor 12 writes texture data represented by the texture address data allotted beforehand in a range of the display area of the RAM 8 indicated by three or four polygon apex address data. In this way, objects (human characters, background models, etc.: player characters, referee characters, a simulated soccer field, simulated goad nets, simulated stands) expressed by pasting the textures to the respective polygons are displayed on the display surface of the monitor 2.

Figure 2:
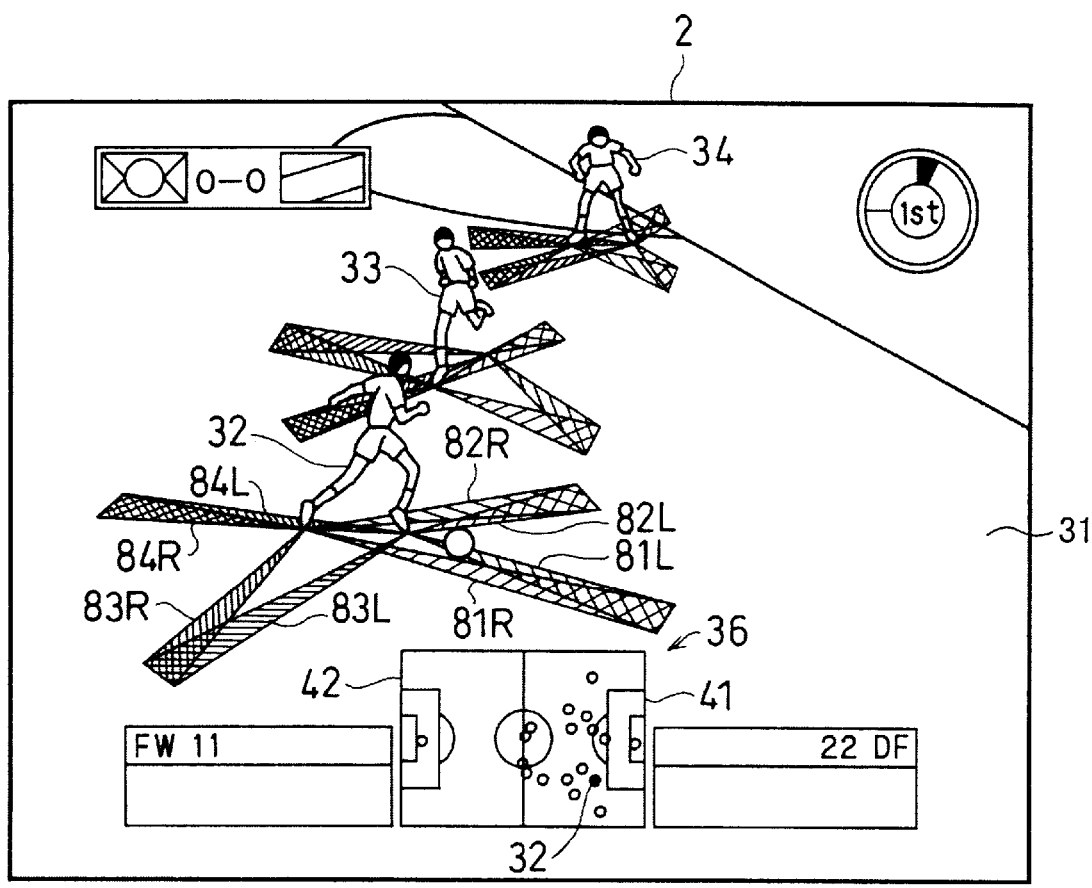
FIG. 2 is a diagram showing one scene of a soccer video game displayed on a monitor.

Next, the soccer video game played by this game system is summarily described with reference to FIG. 2. FIG. 2 is a diagram showing one scene of the soccer video game displayed on the monitor 2. A score card including names of two teams and scores is displayed in the upper left of the screen, a lapsed time is displayed in the upper right thereof, the name (FW11 in this example) of a player presently operated by a game player is displayed in the lower left thereof, and the name (DF22 in this example) of a player of an enemy team located near FW11 is displayed in the lower right thereof.

A soccer field (simulated field) 31 is also displayed on the screen, and a player character 32 operated by the game player, a player character 33 of the enemy team located near the player character 32, a player character 34 of an own team located near the player character 32, and a referee character 35 (see FIG. 5) are displayed on the soccer field 31, respectively. The player character 32 operated by the game player is basically the one who is keeping a ball.

A map 36 simply showing the entire field is displayed in the middle of the bottom part of the screen. In this map 36, the positions of the player characters of the own and enemy teams and that of the player character 32 are distinguishably displayed. This enables the game player to know the positions of the respective player characters in the entire field 31.

Here, operation instructions to give specific movements to the player character 32 are briefly described. The player character 32 moves based on the operation instructions given by the respective buttons of the controller 16, and the game player can also set an operation pattern suited to him. As an example, a moving direction by dribbling is instructed by the stick-shaped controller 16e at the time of offense. Other movements are given by using the other buttons simultaneously with the stick-shaped controller 16e: e.g. pass by the A-button 16b, shoot by the B-button 16c, through-pass by the C1-button 16h, dash by the C2-button 16i, a fly ball by the C3-button 16j and one-two-pass by the C4-button 16k. At the time of defense, desired pattern of movements can be given to the player character 32 by using the similar buttons as above in response to movements of the player characters of the enemy team.

As shown in FIG. 2, shadow images are displayed at the feet of the respective characters 32, 33, 34. This is described later.

Figure 3:
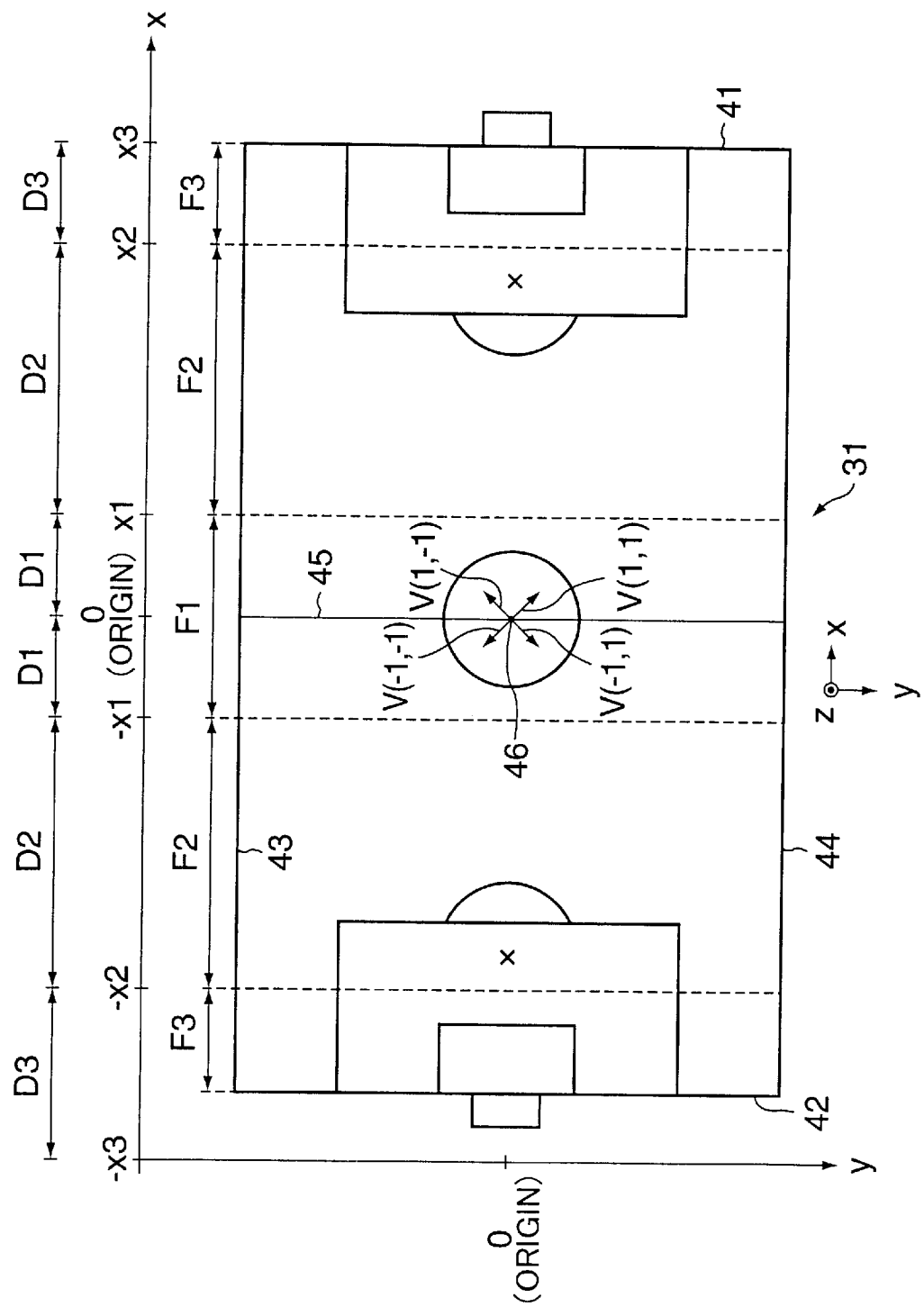
FIG. 3 is a plan view showing a soccer field.

Next, with reference to a plan view of FIG. 3 showing the soccer field, the arrangement of the soccer field and the like in a virtual 3D space coordinate systems according to this embodiment is described.

The soccer field 31 is, similar to a real soccer field, enclosed by goal lines 41 (first side), 42 (second side) and touch lines 43, 44, and includes a half-way line (center line) 45 equidistant from the goal lines 41, 42 and a center mark 46 in the center of the field.

In this embodiment, the center mark 46 of the soccer field 31 is set in an origin (0, 0, 0) of the virtual 3D space (x, y, z); the soccer field 31 extends in a x-y plane; the touch lines 43, 44 are arranged in parallel to x-axis; and the goal lines 41, 42 are arranged in parallel to y-axis.

Further, as shown in FIG. 3, the soccer field 31 is divided into areas F1, F2, and F3. Specifically, the area F1 is a range ±x1 from the origin, i.e. a range within distance D1 from the half-way line 45 in x-axis; the areas F2 are ranges from ±x1 to ±x2, i.e. ranges within distance D2 outside the area F1 in x-axis, and the areas F3 are ranges ±x2 to ±x3, i.e. ranges within distance D3 up to the goal lines 41, 42 outside the areas F2 in x-axis.

Vectors V=(1, 1), (1, −1), (−1, −1), (−1, 1) are set as vectors used to set directions in which the shadow images are generated. The setting of such direction using the vectors V is described later.

Figure 4:
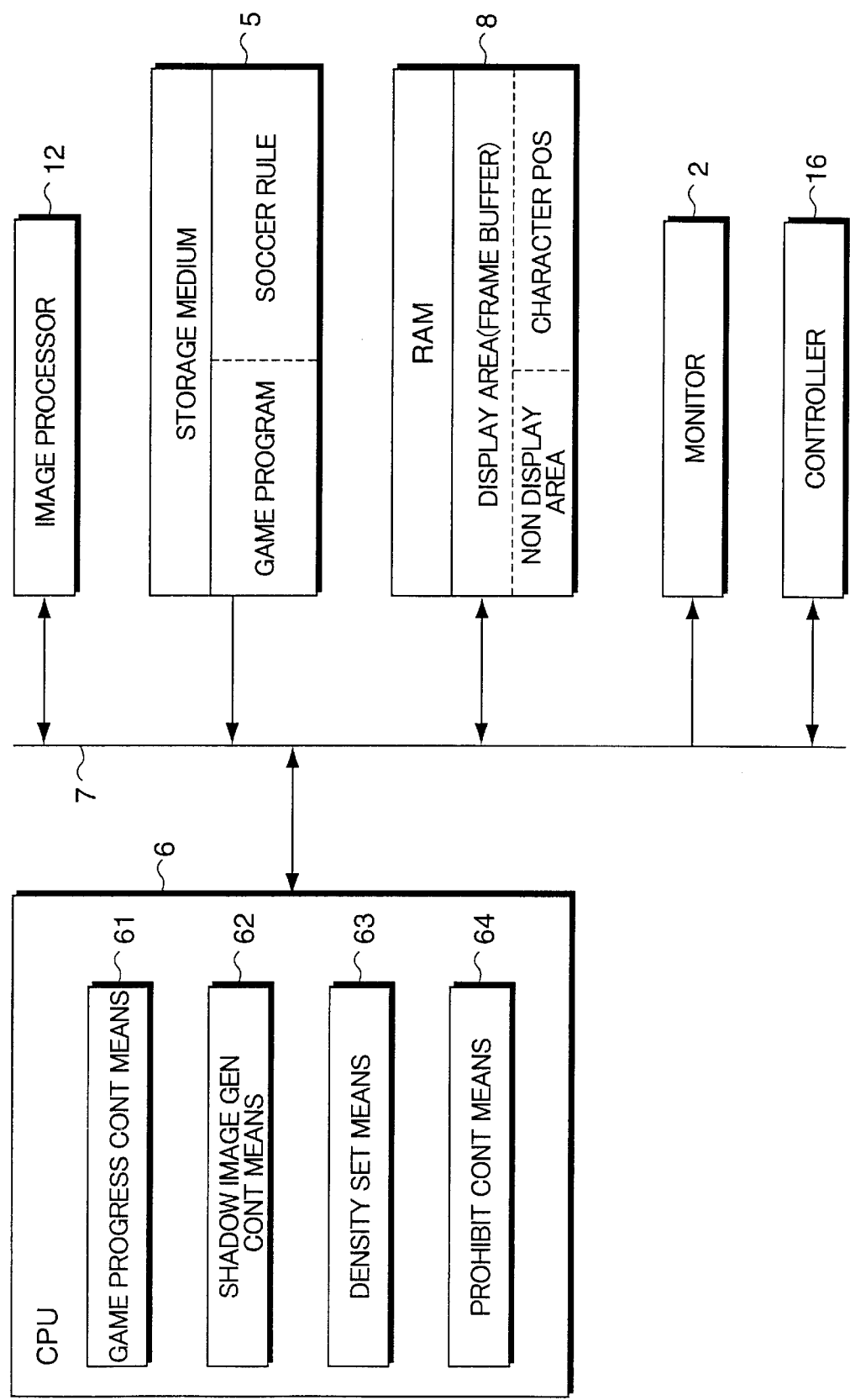
FIG. 4 is a block diagram showing functions of a CPU and a part of the devices shown in FIG. 1, FIGS. 5 to 8 are diagrams each showing one scene of a soccer video game displayed on a monitor.

FIG. 4 is a block diagram showing functions of the CPU 6 and a part of the devices shown in FIG. 1. It should be noted that the elements between the respective shown devices and the bus 7 are not shown in FIG. 4.

In FIG. 4, game programs including various soccer game modes are stored, so that a soccer game (simulated ball game) can be played in accordance with the soccer rules (game rules). Coordinates representing the positions of the respective player characters and the referee character are stored in the non-display area of the RAM 8.

As shown in FIG. 4, the CPU 6 is provided, as function blocks, with a game progress control means 61, a shadow image generation control means 62, a density setting means 63, a prohibition control means 64, a timer function for administering a time of a game and schedules such as leagues, and a calendar function.

The game progress control means 61 has following functions.

(1) Function of displaying various registration screens on the monitor 2 prior to the start of the game. First, a game mode setting screen is displayed with icons. The game modes include, for example, "National League", "World Cup Tournament" and the like. If the game player places a cursor on the position of a desired icon using the cross key 16d and pushes the A-button 16b, the screen on the monitor 2 is switched to the one of the designated game mode. If, for example, the "World Cup Tournament" is designated, a screen "Game Setting" is displayed to enable an enemy team and the like to set.

(2) Function of controlling the movement of the player character operated by the game player in accordance with a command from the controller 16 and controlling the movements of the other player characters and the referee character in conformity with the actual soccer rules. With this function, the positions of the respective player characters and the referee character are administered using positions corresponding to their waist (specific body part). Coordinates of the positions corresponding to the waists of the respective player characters and the referee character and those of specific positions (e.g. leading end positions in this embodiment) of the left and right feet (legs) of the respective characters are renewably stored in the non-display area of the RAM 8 in a specified sampling cycle.

In this embodiment, both a one-person play in which the selected player characters of the game player's team compete with CPU-controlled player characters of an enemy team selected by the CPU 6 or the game player using one controller 6 and a two-persons play in which two game players select their own teams and cause the selected teams to compete with each other using two controllers 16 can be performed.

In the case of the one-person play, the controller 16 gives various offense movement instructions to the player character keeping a ball character out of those of the own team. If the ball character is on the enemy team side, the controller 16 gives various defense movement instructions to the player character of the own team closest to the enemy player character keeping the ball character. For the other player characters, the game progress control means 61 administers and controls the positions of the respective player characters by conducting calculation in accordance with a game program maximally conforming to actual soccer rules, so that the game smoothly progresses and the game player has no feeling of incongruity concerning the flow of the entire game.

In the case of the two-persons play, the player character keeping the ball character and the player character of the enemy team closest to the former player are motion-controlled by the respective controllers 16. The other player characters are motion-controlled in conformity with the soccer rules substantially in the same manner as described above.

The shadow image generation control means 62 has a function of generating shadow images for all the player characters and the referee character who appear on the screen of the monitor 2 (these characters are collectively referred to as "appearing characters" for the sake of convenience). A specific procedure of generating the shadow image is described later.

Coordinates Q (xs, ys) of the leading end of a shadow image to be generated are defined as follows:

$$Q(xs, ys) = (xm, ym) + V \cdot zm \qquad \ldots (1).$$

Here, (xm, ym, z,), V denote coordinates of the waist of the appearing character and the vector V shown in FIG. 3. It should be noted that the shadow image is located on the soccer field 31 and, accordingly, z-coordinates are deleted because they are 0.

As can be seen from equation (1), the leading end of the shadow image is located a specified distance away from an intersection of a straight line suspended from the position of the waist and the field 31 in a direction of the vector V. This specified distance corresponds to the height of the waist of the appearing character as can be understood from the second term of the right side of equation (1).

Shadow images (first shadow images) in directions of vectors V=(1, 1), (1, −1) represent shadows by two virtual illumination lights set outside the goal line 42, whereas shadow images (second shadow images) in directions of vectors V=(−1, −1), (−1, 1) represent shadows by two virtual illumination lights set outside the goal line 41. The directions of each pair of vectors V are orthogonal to each other.

The base end of the shadow image is an intersection of a straight line suspended from a specified position (e.g. leading end position) of the left or right foot and the soccer field 31 as described in a procedure later.

The density setting means 63 has a function of setting the density of the shadow image. A specific setting procedure is described later. The density of the shadow image is set in accordance with following equations (2) and (3).

$$HA = 1.0 - (|xm| - x1)/D2 \qquad \ldots (2).$$

Here, HA, xm, x1 and D2 denote transparency of the shadow image, x-coordinate of the waist of the appearing character as described above, a positive x-coordinate of the boundary between the areas F1 and F2 as described with reference to FIG. 3, and a width of the areas F2 in x-axis direction as described with reference to FIG. 3.

Equation (2) is used when the appearing character is located in the area F2 (see FIG. 3) of the soccer field 31 (x1≦|xm|≦x2) and represents that the transparency of the shadow image is reduced (shadow image becomes less dense) as a distance between the appearing character and the half-way line 45 increases in the area F2. When the appearing character is located in the area F1, HA=1.0.

$$PC = BC \times (1.0 - PA \times HA) + PA \times HA \qquad \ldots (3).$$

Here, PC, BC, PA denote a color of a pixel, a color of a background image and transparency of a polygon. The first term of the right side of equation (3) represents that the color of the background image is made less dense as much as the transparency of the shadow image, and equation (3) represents that the color of the pixel is obtained by adding (PA×HA) to such a color of the background image having been made less dense.

The prohibition control means 64 has following functions (1) and (2).

(1) Function of prohibiting generation of the shadow images (first shadow images) extending in the directions of the vectors V=(1, 1), (1, −1), i.e. extending toward the goal line (first side) 41 when the x-coordinate of the waist of the appearing character is located in the right (at the side of the goal line 41) area F3 in FIG. 3.

(2) Function of prohibiting generation of the shadow images (second shadow images) extending in the directions of the vectors V=(−1, −1), V=(−1, 1), i.e. extending toward the goal line (second side) 42 when the x-coordinate of the waist of the appearing character is located in the left (at the side of the goal line 42) area F3 in FIG. 3.

Figure 7:
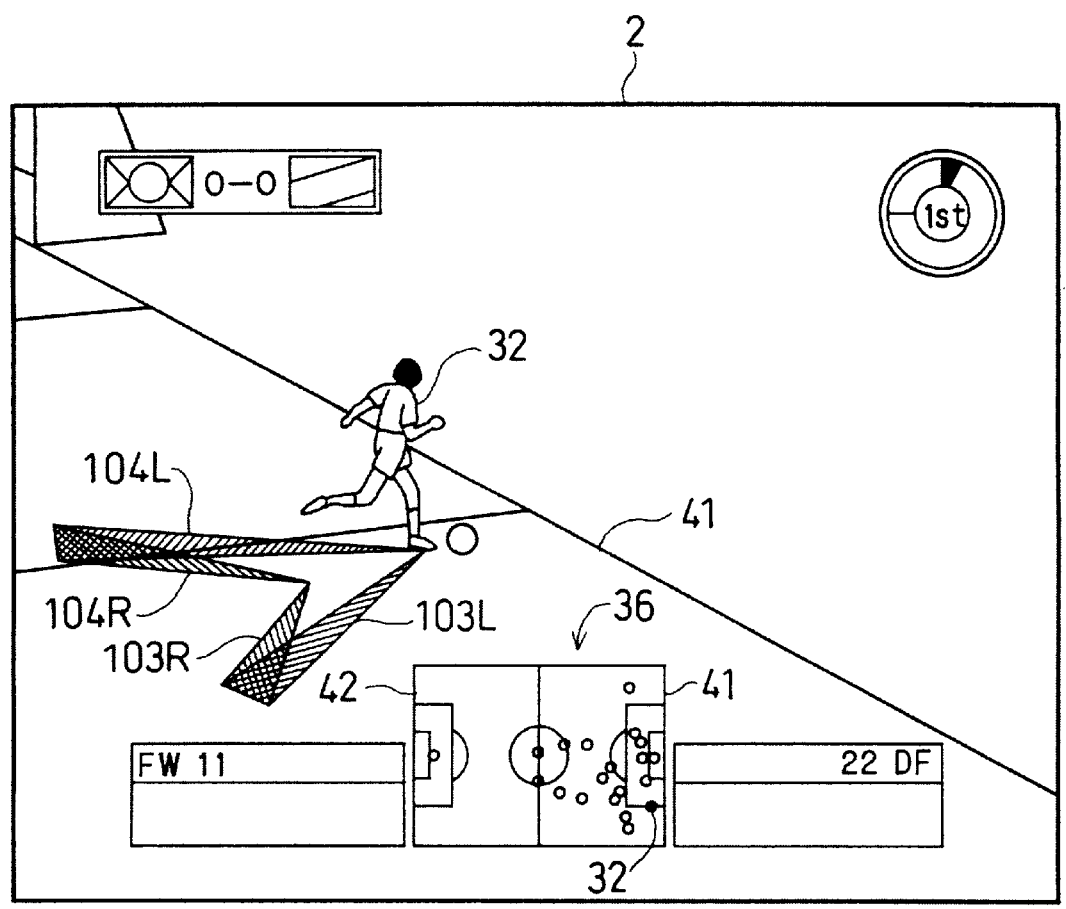
Figure 8:
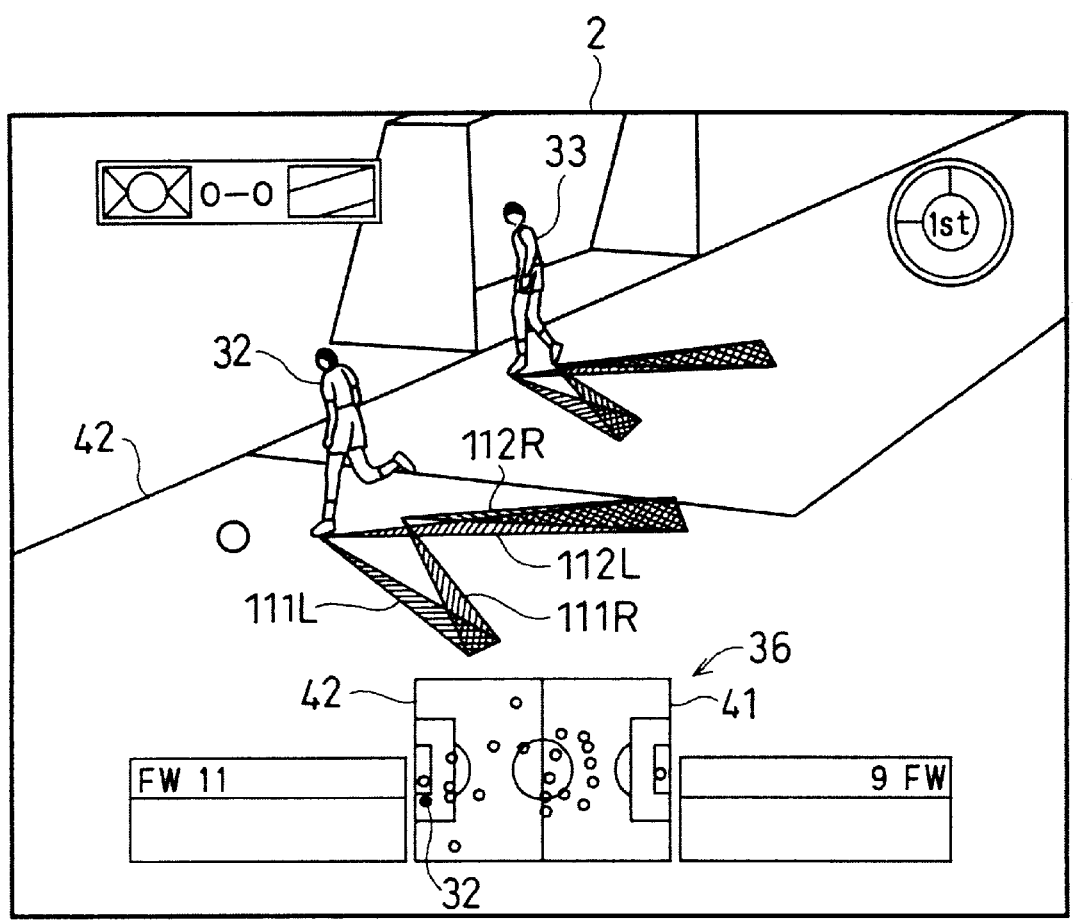
Figure 9:
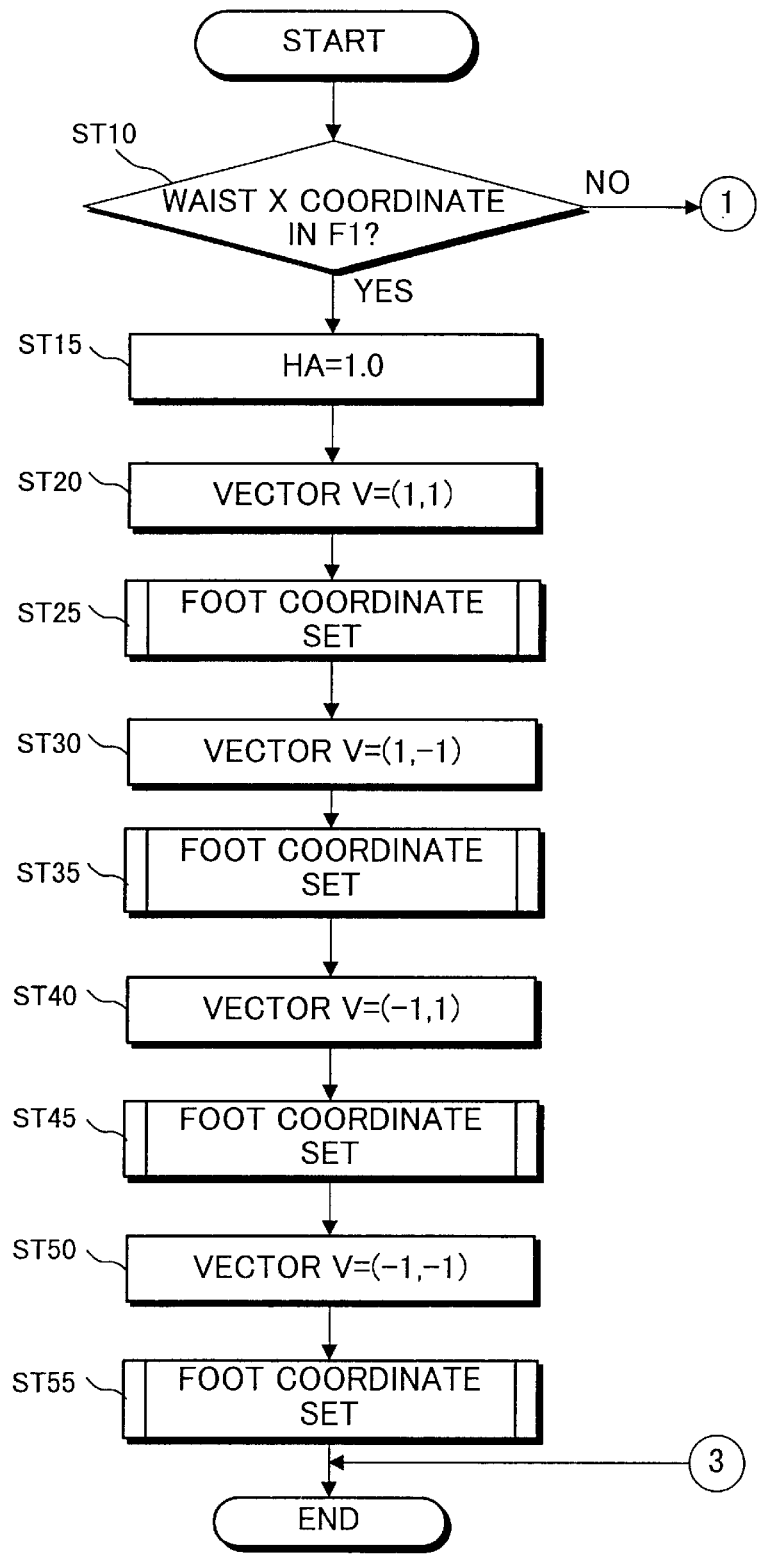
FIGS. 9 to 11 are a flow chart showing a main routine of shadow image generation and shadow image density setting.
Figure 10:
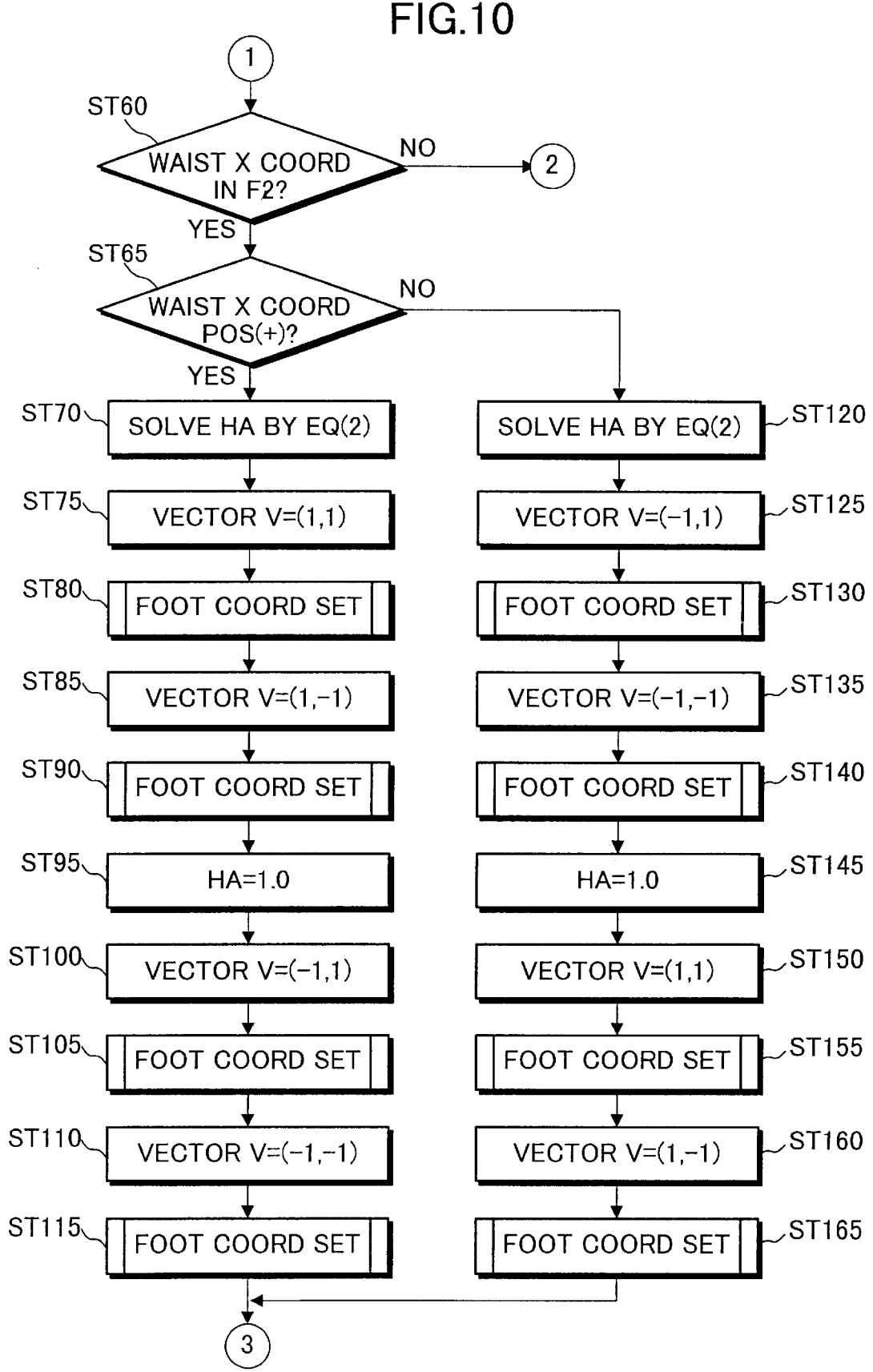
Figure 11:
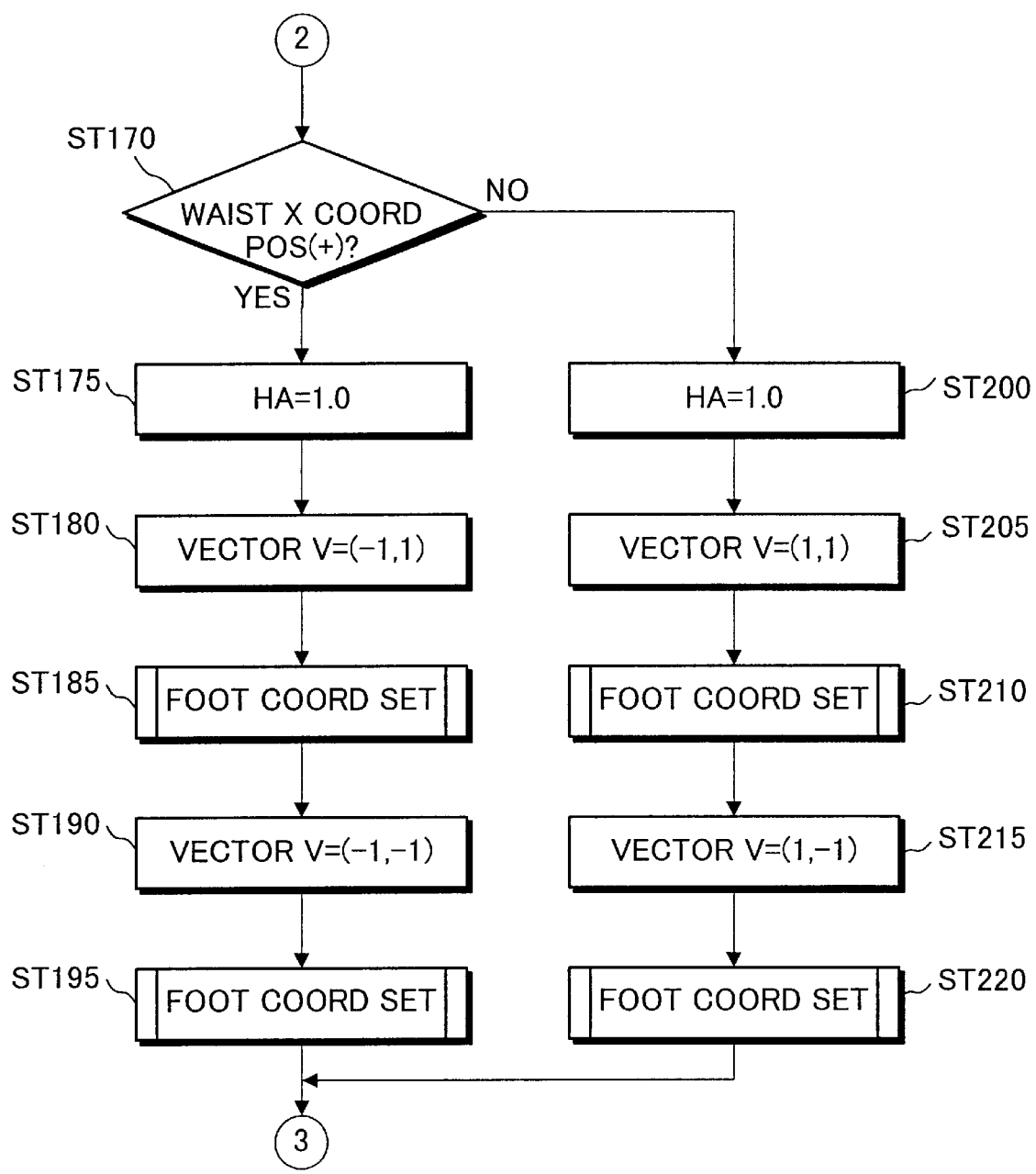
Figure 12:
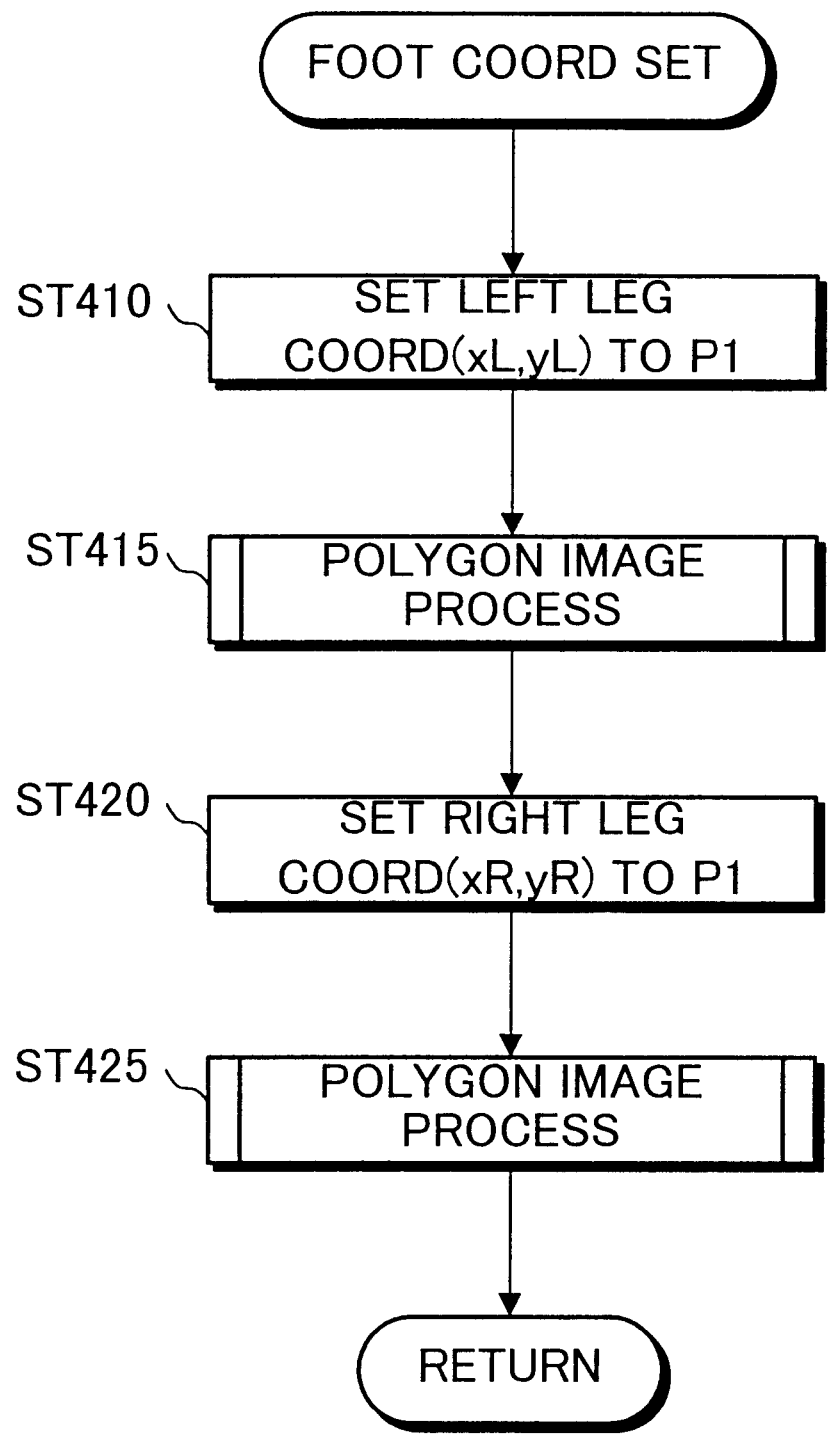
FIG. 12 is a flow chart showing a subroutine "Foot Coordinates Setting"
Figure 13:
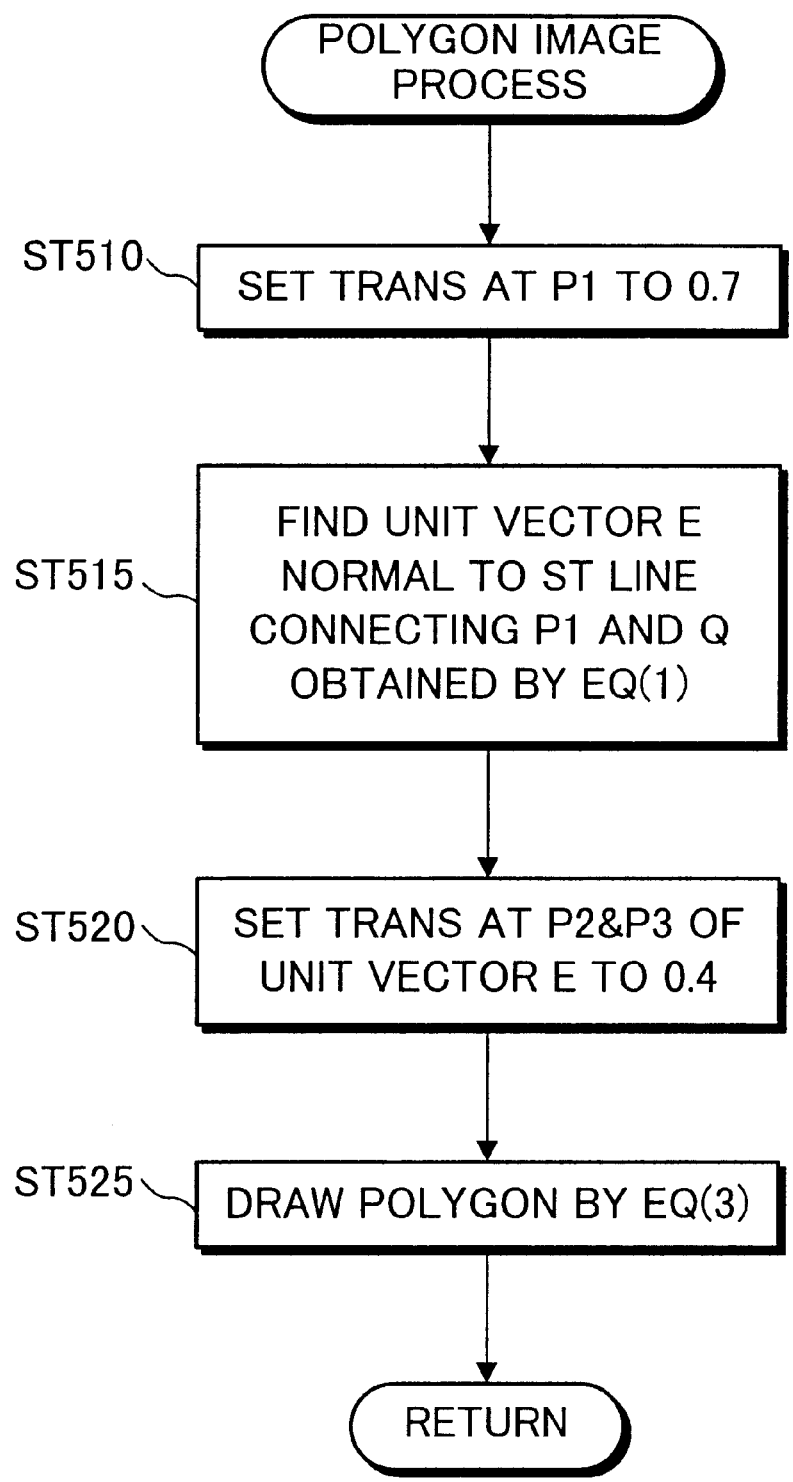
FIG. 13 is a flow chart showing a subroutine "Polygon Imaging"

Next, how the shadow image is generated and its density is set by the shadow image generation control means 62 and the density setting means 63 is described in accordance with flow charts shown in FIGS. 9 to 13 while referring to FIGS. 2, 5 to 8 showing the scenes of the game and FIG. 3 showing the soccer field 31. FIGS. 9 to 11 are a flow chart showing a main routine of shadow image generation and shadow image density setting, FIG. 12 is a flow chart showing a subroutine "Foot Coordinates Setting", and FIG. 13 is a flow chart showing a subroutine "Polygon Imaging".

Figure 5:
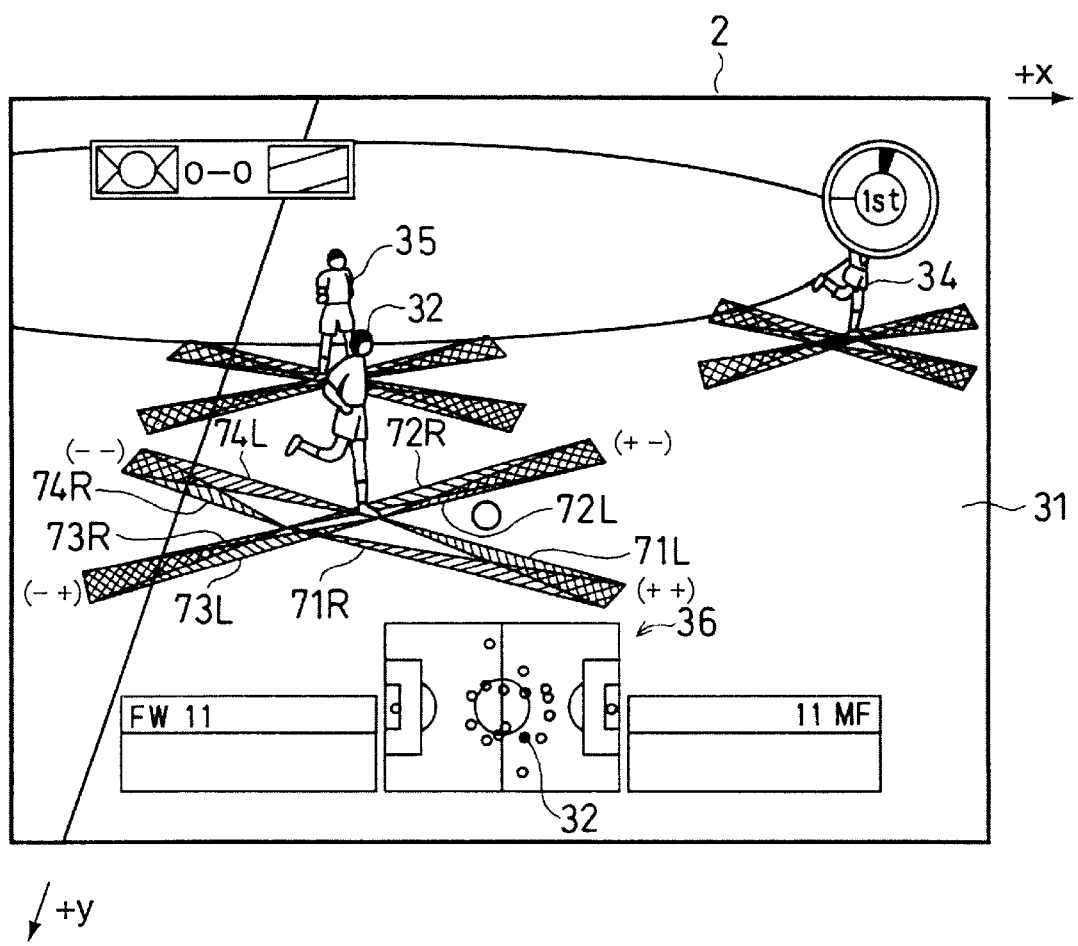

The routine shown in FIGS. 9 to 11 are executed for each of the appearing character. In FIG. 9, it is discriminated whether the x-coordinate of the waist of the appearing character is located in the area F1 (see FIG. 3) (Step ST10). This routine proceeds to Step ST15 if this x-coordinate is located in the area F1 (YES in Step ST10) while proceeding to Step ST60 of FIG. 10 to be described later if it is not located in the area F1 (NO in Step ST10). An example of the state where the x-coordinate of the waist of appearing character is located in the area F1 is shown in FIG. 5.

Referring back to FIG. 9, HA is set at 1.0 (Step ST15), the vector V is set at (1, 1) (Step ST20), and the subroutine "Foot Coordinates Setting" is executed (Step ST25).

In the subroutine "Foot Coordinates Setting" of FIG. 12, x,-y-coordinates (xL, yL) of the left foot are set as an apex P1 (Step ST410), and the subroutine "Polygon Imaging" is executed (Step ST415).

In the subroutine "Polygon Imaging" of FIG. 13, the transparency at the apex P1 is set at 0.7 (Step ST510), and a unit vector E which is normal to a straight line connecting the apex P1 and the apex Q obtained by equation (1) and passing the apex Q is obtained (Step ST515). Since the vector V=(1, 1) in Step ST20, Q(Xs, Ys)=(Xm+Zm, Ym+Zm) is given by equation (1).

Subsequently, the transparency at start and end points P2, P3 of the unit vector E is set at 0.4 (Step ST520), and a polygon defined by the apices P1, P2, P3 is imaged by equation (3) (Step ST525).

The subroutine "Polygon Imaging" in Step ST415 of FIG. 12 is completed in this manner, and a shadow image 71L extending in the direction of the vector V=(1, 1) is formed, for example, for the left foot of the player character 32 of FIG. 5.

Subsequently, x-, y-coordinates (xR, yR) of the right foot are set as an apex P1 (Step ST420), and the subroutine "Polygon Imaging" is executed (Step ST425). In this way, a shadow image 71R extending in the direction of the vector V=(1, 1) is formed, for example, for the right foot of the player character 32 of FIG. 5.

The subroutine "Foot Coordinates Setting" in Step ST25 of FIG. 9 is completed in this way. Subsequently, the vector V is set at (1, −1) (Step ST30), and the subroutine "Foot Coordinates Setting" is executed (Step ST35). By this subroutine, shadow images 72L, 72R extending in the direction of the vector V=(1, −1) are formed, for example, for the left and right feet of the player character 32 of FIG. 5.

Subsequently, the vector V is set at (−1, 1) (Step ST40), and the subroutine "Foot Coordinates Setting" is executed (Step ST45). By this subroutine, shadow images 73L, 73R extending in the direction of the vector V=(−1, 1) are formed, for example, for the left and right feet of the player character 32 of FIG. 5.

Subsequently, the vector V is set at (−1, −1) (Step ST50), and the subroutine "Foot Coordinates Setting" is executed (Step ST55). By this subroutine, shadow images 74L, 74R extending in the direction of the vector V=(−1, −1) are formed, for example, for the left and right feet of the player character 32 of FIG. 5.

When the x-coordinate of the waist of the appearing character is located in the area F1 (see FIG. 3), HA is fixedly set at 1.0 (Step ST15) and accordingly all the shadow images of the same density are generated.

If the x-coordinate of the waist of the appearing character is not located in the area F1 (NO in Step ST10 of FIG. 9), it is discriminated whether the x-coordinate of the waist of the appearing character is located in the area F2 (see FIG. 3) (Step ST60 of FIG. 10). This routine proceeds to Step ST65 if this x-coordinate is located in the area F2 (YES in Step ST60) while proceeding to Step ST170 of FIG. 11 to be described later if it is not located in the area F2 (NO in Step ST60).

In Step ST65, it is discriminated whether the x-coordinate of the waist of the appearing character is positive. This routine proceeds to Step ST70 if this x-coordinate is positive (YES in Step ST65) while proceeding to Step ST120 if it is negative (NO in Step ST65).

Step ST70 and subsequent Steps are a procedure in the case that the x-coordinate of the waist of the appearing character is located in the right area F2 in FIG. 3, and an example of this state is shown in FIG. 2.

In Step ST70 of FIG. 10, the transparency HA of the shadow image is calculated by equation (2). Subsequently, the vector V is set at (1, 1) (Step ST75), and the subroutine "Foot Coordinates Setting" is executed (Step ST80). By this subroutine, shadow images 81L, 81R extending in the direction of the vector V=(1, 1) are formed, for example, for the left and right feet of the player character 32 of FIG. 2.

Subsequently, the vector V is set at (1, −1) (Step ST85), and the subroutine "Foot Coordinates Setting" is executed (Step ST90). By this subroutine, shadow images 82L, 82R extending in the direction of the vector V=(1, −1) are formed, for example, for the left and right feet of the player character 32 of FIG. 2.

In Step St95 of FIG. 10, HA is set at 1.0. Subsequently, the vector V is set at (−1, 1) (Step ST100), and the subroutine "Foot Coordinates Setting" is executed (Step ST105). By this subroutine, shadow images 83L, 83R extending in the direction of the vector V=(−1, 1) are formed, for example, for the left and right feet of the player character 32 of FIG. 2.

Subsequently, the vector V is set at (−1, −1) (Step ST110), and the subroutine "Foot Coordinates Setting" is executed (Step ST115). By this subroutine, shadow images 84L, 84R extending in the direction of the vector V=(−1, −1) are formed, for example, for the left and right feet of the player character 32 of FIG. 2.

In this way, when the x-coordinate of the waist of the appearing character is located in the right area F2 in FIG. 3, the shadow images 81L, 81R, 82L, 82R extending toward the goal line 41 are generated at low density given by equation (2) (shown by rough hatching in FIG. 2), and the shadow images 83L, 83R, 84L, 84R extending toward the goal line 42 are generated at the same density as in the area F1 (shown by dense hatching in FIG. 2).

Figure 6:
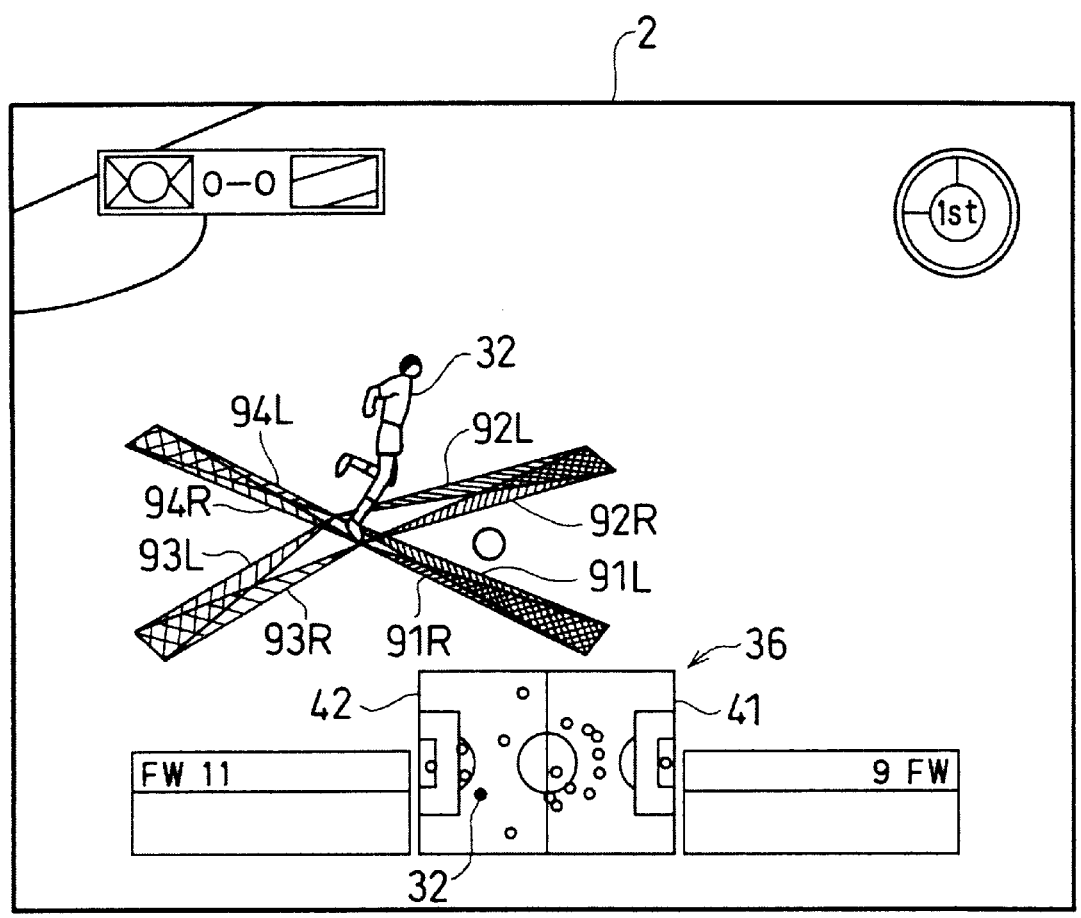

Step ST120 and subsequent Steps are a procedure in the case that the x-coordinate of the waist of the appearing character is located in the left area F2 in FIG. 3, and an example of this state is shown in FIG. 6.

In Step ST120 of FIG. 10, the transparency HA of the shadow image is calculated by equation (2). Subsequently, the vector V is set at (−1, 1) (Step ST125), and the subroutine "Foot Coordinates Setting" is executed (Step ST130). By this subroutine, shadow images 93L, 93R extending in the direction of the vector V=(−1, 1) are formed, for example, for the left and right feet of the player character 32 of FIG. 6.

Subsequently, the vector V is set at (−1, −1) (Step ST135 of FIG. 10), and the subroutine "Foot Coordinates Setting" is executed (Step ST140). By this subroutine, shadow images 94L, 94R extending in the direction of the vector V=(−1, −1) are formed, for example, for the left and right feet of the player character 32 of FIG. 6.

In Step ST145 of FIG. 10, HA is set at 1.0. Subsequently, the vector V is set at (1, 1) (Step ST150), and the subroutine "Foot Coordinates Setting" is executed (Step ST155). By this subroutine, shadow images 91L, 91R extending in the direction of the vector V=(1, 1) are formed, for example, for the left and right feet of the player character 32 of FIG. 6.

Subsequently, the vector V is set at (1, −1) (Step ST160 of FIG. 10), and the subroutine "Foot Coordinates Setting" is executed (Step ST165). By this subroutine, shadow images 92L, 92R extending in the direction of the vector V=(1, −1) are formed, for example, for the left and right feet of the player character 32 of FIG. 6.

In this way, when the x-coordinate of the waist of the appearing character is located in the left area F2 in FIG. 3, the shadow images 93L, 93R, 94L, 94R extending toward the goal line 42 are generated at the low density given by equation (2) (shown by rough hatching in FIG. 6), and the shadow images 91L, 91R, 92L, 92R extending toward the goal line 41 are generated at the same density as in the area F1 (shown by dense hatching in FIG. 6).

If the x-coordinate of the waist of the appearing character is not located in the area F2 (NO in Step ST60 of FIG. 10), it means that this x-coordinate is located in the area F3 (see FIG. 3). In Step ST170 of FIG. 11, it is discriminated whether the x-coordinate of the waist of the appearing character is positive. This routine proceeds to Step ST175 if this x-coordinate is positive (YES in Step ST170) while proceeding to Step ST200 if it is negative (NO in Step ST170).

Step ST175 and subsequent Steps are a procedure in the case that the x-coordinate of the waist of the appearing character is located in the right area F3 in FIG. 3, and an example of this state is shown in FIG. 7.

In Step ST175 of FIG. 11, HA is set at 1.0. Subsequently, the vector V is set at (−1, 1) (Step ST180), and the subroutine "Foot Coordinates Setting" is executed (Step ST185). By this subroutine, shadow images 103L, 103R extending in the direction of the vector V=(−1, 1) are formed, for example, for the left and right feet of the player character 32 of FIG. 7.

Subsequently, the vector V is set at (−1, −1) (Step ST190), and the subroutine "Foot Coordinates Setting" is executed (Step ST195). By this subroutine, shadow images 104L, 104R extending in the direction of the vector V=(−1, −1) are formed, for example, for the left and right feet of the player character 32 of FIG. 7.

In this way, when the x-coordinate of the waist of the appearing character is located in the right area F3 in FIG. 3, no shadow image extending toward the goal line 41 is generated, and only the shadow images 103L, 103R, 104L, 104R extending toward the goal line 42 are generated at the same density as in the area F1.

Step ST200 and subsequent Steps are a procedure in the case that the x-coordinate of the waist of the appearing character is located in the left area F3 in FIG. 3, and an example of this state is shown in FIG. 8.

In Step ST200 of FIG. 11, HA is set at 1.0. Subsequently, the vector V is set at (1, 1) (Step ST205), and the subroutine "Foot Coordinates Setting" is executed (Step ST210). By this subroutine, shadow images 111L, 111R extending in the direction of the vector V (1, 1) are formed, for example, for the left and right feet of the player character 32 of FIG. 8.

Subsequently, the vector V is set at (1, −1) (Step ST215), and the subroutine "Foot Coordinates Setting" is executed (Step ST220). By this subroutine, shadow images 112L, 112R extending in the direction of the vector V=(1, −1) are formed, for example, for the left and right feet of the player character 32 of FIG. 8.

In this way, when the x-coordinate of the waist of the appearing character is located in the left area F3 in FIG. 3, no shadow image extending toward the goal line 42 is generated, and only the shadow images 111L, 111R, 112L, 112R extending toward the goal line 41 are generated at the same density as in the area F1.

Figure 14:
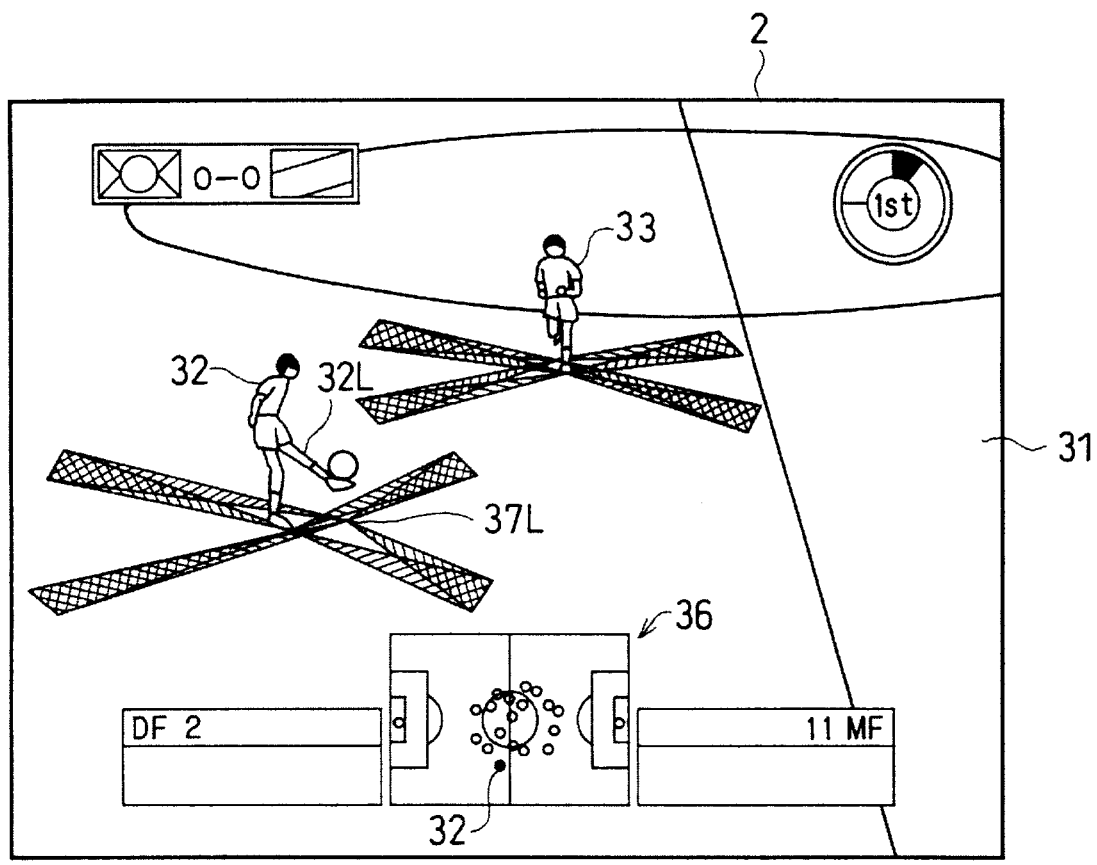
FIGS. 14 and 15 are diagrams each showing one scene of a soccer video game displayed on a monitor.
Figure 15:
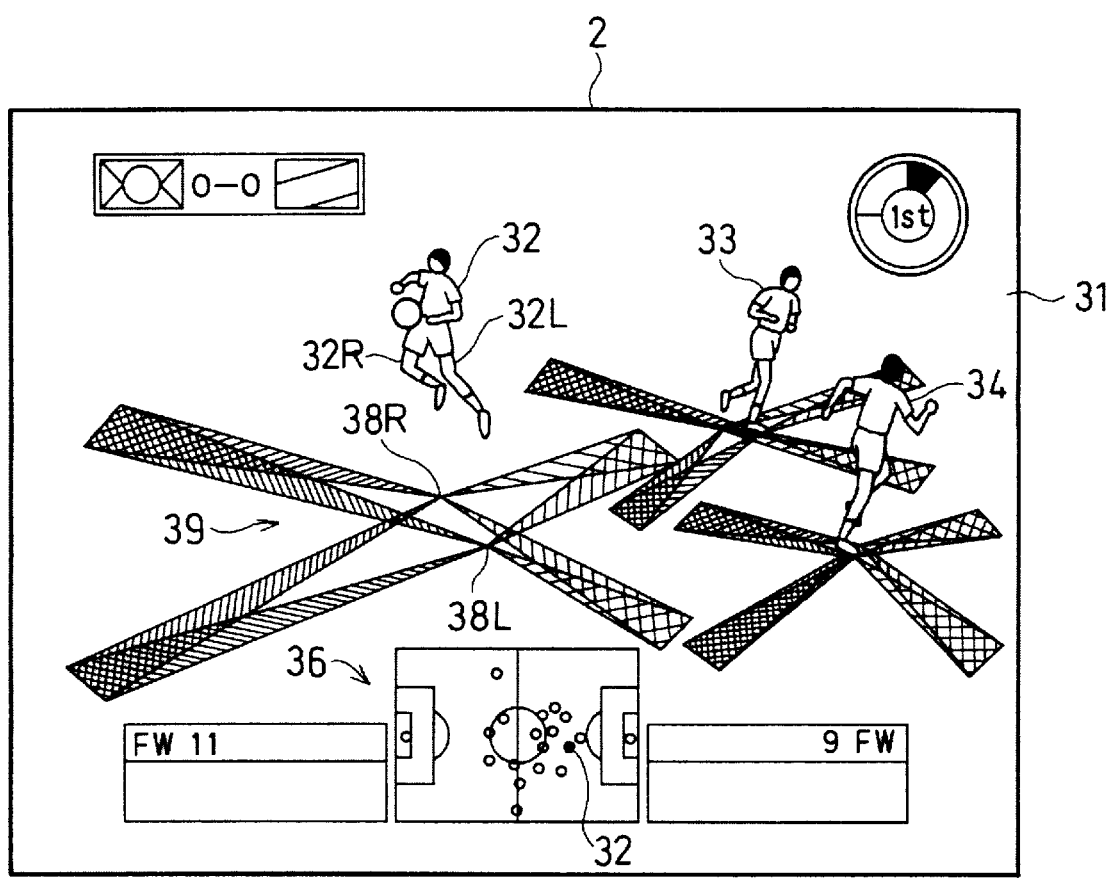

FIGS. 14 and 15 are diagrams showing other scenes of the soccer game. In the case that the feet of the player characters such as the left foot 32L of the player character 32 in FIG. 14 and the left and right feet 32L, 32R of the player characters 32 in FIG. 15 are vertically distanced from the field 31, base ends 37L (see FIG. 14), 38L, 38R (see FIG. 15) of the respective shadow images are located at the intersections of the straight lines suspended from the coordinates of the respective feet and the field 31 as shown in Steps ST410 and ST420 of FIG. 12.

Further, in the case that the z-coordinate of the waist of the player character is located higher from the field 31 due to a jump like the player character 32 in FIG. 15, a distance between the intersection of the straight line suspended from the coordinates of the waist and the field 31 and the leading end of the shadow image becomes longer. Accordingly, longer shadow images 39 are generated as shown in FIG. 15.

As described above, the density of the shadow image is set based on the x-coordinate of the waist of the appearing character on the soccer field 31 according to this embodiment. Thus, realistic images can be generated by simple calculation without performing a complicated light source calculation and can be displayed on the monitor 2. This brings about remarkable effects in video games of such simulated ball games in which a plurality of player characters appear on the screen and speedily move as in a soccer game.

The present invention is not limited to the foregoing embodiment, and may be embodied as follows.

(1) Although the field 31 is divided into the areas F1, F2, F3 along the x-axis direction as shown in FIG. 3, and the density of the shadow image is set based on the x-coordinate of the waist of the appearing character as defined by equation (2) in the foregoing embodiment, the present invention is not limited thereto. For instance, the field 31 may also be divided along the y-axis direction, and the density of the shadow images extending in the direction of the vector V=(1, 1) may be differed from that of the shadow images extending in the direction of the vector V=(1, −1) based on the y-coordinate or the density of the shadow images extending in the direction of the vector V=(−1, −1) may be differed from that of the shadow images extending in the direction of the vector V=(−1, 1) based on the y-coordinate.

(2) In the foregoing embodiment, when the x-coordinate of the waist of the appearing character is located in the right area F2 in FIG. 3, the shadow images 83L, 83R, 84L, 8R extending toward the goal line 42 are generated at the same density as in the area F1, and when the x-coordinate of the waist of the appearing character is located in the left area F2 in FIG. 3, the shadow images 91L, 91R, 92L, 92R (see FIG. 6) extending toward the goal line 41 are generated at the same density as in the area F1. However, the present invention is not limited thereto. For instance, the density may be changed according to the x-coordinates.

Specifically, when the x-coordinate of the waist of the appearing character is located in the right area F2 in FIG. 3, the density of the shadow images extending toward the goal line 42 may be increased as a distance between the appearing character and the half-way line 45 increases, and when the x-coordinate of the waist of the appearing character is located in the left area F2 in FIG. 3, the density of the shadow images extending toward the goal line 42 may be increased as a distance between the appearing character and the half-way line 45 increases.

(3) Although the dimensions of the shadow images are determined based on the z-coordinate of the waist of the appearing character in the foregoing embodiment, the present invention may not be limited thereto. For instance, they may be determined based on the x-coordinate of the waist of the appearing character. According to this embodiment, more realistic images can be generated since the dimensions of the shadow images changes according to the position of the appearing character on the field 31.

(4) Although the positions of the player characters and the referee character are administered using the positions corresponding to their waists and the dimensions of the shadow images are determined based on the z-coordinates of their waists, the present invention is not limited thereto. Instead of the coordinates of the waist, the coordinates corresponding to an other body part such as a head may be used.

(5) In the foregoing embodiment, the prohibition control means 64 is provided. When the x-coordinate of the waist of the appearing character is located in the right area F3 in FIG. 3, the generation of the shadow images in the directions of the vectors V=(1, 1), (1, −1) is prohibited. On the other hand, when the x-coordinate of the waist of the appearing character is located in the left area F3 in FIG. 3, the generation of the shadow images in the directions of the vectors V=(−1, −1), (1, −1) is prohibited. However, the present invention is not limited thereto.

For instance, instead of providing the prohibition control means 64, the density of the shadow images extending in the directions of the vectors V=(1, 1), (1, −1) may be set at 0 when the x-coordinate of the waist of the appearing character is located in the right area F3 in FIG. 3, whereas the density of the shadow images extending in the directions of the vectors V=(−1, −1), (−1, 1) may be set at 0 when the x-coordinate of the waist of the appearing character is located in the left area F3 in FIG. 3.

(6) Although the present invention is applied to the soccer game as an example of the simulated ball games in the foregoing embodiment, it may also be applied to a baseball game, field and track events or the like in which competition is made under floodlight or a basketball game or the like in which competition is made under indoor illumination.

As described above, the inventive image generating device comprises the shadow image generation control means for generating the shadow image belonging to the character located on the simulated field set in the virtual 3D space and extending at least in one direction, the density setting means for setting the density of the shadow image based on the position of the character on the simulated field, the display means and the display control means for displaying the generated shadow image at the set density on the display means.

In the image generating device thus constructed, the shadow image belonging to the character located on the simulated field set in the virtual 3D space and extending at least in one direction is generated, the density thereof is set based on the position of the character on the simulated field, and the generated shadow image is displayed at the set density on the display means. Accordingly, the shadow image of the character can be generated by simple calculation and displayed, with the result that realistic images which look as if they were illuminated by simulated illumination lights at night can be easily obtained.

The above character has legs, and the density setting means may assume the position of a specific body part of the character other than his legs as the position of the character. With this construction, the shadow images of the legs to this specific body part of the character can be easily generated.

The shadow image generation control means may generate the shadow image using the intersection of the straight line suspended from the leg of the character and the field as a base end. With this construction, the shadow image can be easily generated by simple calculation regardless of the height of the leg of the character from the simulated field.

The shadow image generation control means may generate the shadow image using the position spaced a specified distance in the predetermined direction away from the intersection of the straight line suspended from the specified body part of the character and the simulated field as the leading end. With this construction, the shadow image can be easily generated since the position of the leading end of the shadow image can be obtained by simple calculation.

If the shadow image generation control means determines the specified distance based on the height of the specified body part from the simulated field, the dimensions of the shadow images are changed according to the height of the specified body part of the character from the simulated field. As a result, more realistic shadow images can be generated.

The simulated field may be rectangular, having first and second sides opposed to each other and a center line which is equidistant from the first and second sides, the image generation control means may generate at least one shadow image belonging to the character and extending toward the first side and at least one second shadow image belonging to the character and extending toward the second side, and the density setting means sets the densities of the first and second shadow images based on the distance between the position of the character and the center line.

With this construction, at least one first shadow image extending toward the first side and at least one second shadow image extending toward the second side, both images belonging to the character, are generated on the rectangular simulated field having the first and second sides opposed to each other and the center line which is equidistant from the first and second sides. The densities of these shadow images are set based on the distance between the position of the character and the center line. Accordingly, realistic images which look as if simulated illumination lights for illuminating the simulated field were set outside the first and second side of the simulated field can be generated.

The density setting means may reduce the density of the first shadow image as the distance between the position of the character and the center line increases when the character is located in the specified range between the center line and the first side while reducing the density of the second shadow image as the distance between the position of the character and the center line increases when the character is located in the specified range between the center line and the second side.

With this construction, more realistic images which look as if the densities of the shadow images were reduced as the distance between the position of the character and the simulated illumination set outside the first and second side of the simulated field increases can be generated.

The density setting means may set the densities of the first and second shadow images at a fixed level when the character is located with the specified distance from the center line. With this construction, the calculation of the shadow images is easier and, therefore, the shadow images can be more easily generated.

The density setting means may set the density of the first shadow image at 0 when the character is located with the specified distance from the first side while setting the density of the second shadow image at 0 when the character is located with the specified distance from the second side. With this construction, the calculation of the shadow images is easier and, therefore, the shadow images can be more easily generated.

Further, the prohibition control means for prohibiting the generation of the first shadow image when the character is located within the specified distance from the first side while prohibiting the generation of the second shadow image when the character is located within the specified distance from the second side may be provided. With this construction, the calculation of the shadow images is easier and, therefore, the shadow images can be more easily generated.

The inventive image generating method comprises the steps of generating the shadow image belonging to the character located on the simulated field set in the virtual 3D space and extending at least in one direction, setting the density of the shadow image based on the position of the character on the simulated field, and displaying the generated shadow image at the set density on the display means.

According to this method, the shadow image of the character can be generated by simple calculation without performing a complicated light source calculation, and be displayed. Thus, realistic images which look as if they were illuminated by the simulated illumination lights at night can be easily obtained.

The inventive readable storage medium storing the image generating program is adapted to cause the computer to realize the shadow image generating function of generating the shadow image belonging to the character located on the simulated field set in the virtual 3D space and extending at least in one direction, the density setting function of setting the density of the shadow image based on the position of the character on the simulated field, and the display function of displaying the generated shadow image at the set density on the display means.

By reading the readable storage medium and implementing the image generating program by means of the computer, the shadow image belonging to the character located on the simulated field set in the virtual 3D space and extending at least in one direction is generated, the density of the shadow image is set based on the position of the character on the simulated field, and the generated shadow image is displayed at the set density on the display means. Accordingly, the shadow images can be generated by simple calculation without performing a complicated light source calculation, with the result that realistic images which look as if they are illuminated by the simulated illumination lights at night can be easily obtained.

The inventive video game system comprises the image generating device, the program storage means storing the game program, the operation means for outputting the operation signal corresponding to the external operation, and the game progress control means for controlling the position of the character on the simulated field in response to the operation signal in accordance with the game program.

With the video game system thus constructed, the position of the character on the simulated field is controlled in response to the operation signal outputted from the operation means and corresponding to the external operation in accordance with the game program stored in the program storage means. Accordingly, the shadow images can be generated by simple calculation without performing a complicated light source calculation, with the result that a video game whose realistic images looking as if they are illuminated by the simulated illumination lights at night are displayed on the display means can be easily obtained.

The program storage means stores the game program for carrying out the simulated ball game in accordance with the specified ball game rules, the simulated field is used for the simulated ball game, and the characters include player characters who play the simulated ball game.

With this construction, the shadow images of the player characters playing the simulated ball game such as a soccer game on the simulated field can be easily generated by simple calculation, and realistic images which look as if the simulated ball game were played at night can be obtained.

This invention is based on Japanese Patent Application Serial No. HEI 11-211013 filed on Jul. 26, 1999, whose priority is claimed, thus the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image generating device, comprising:
shadow image generation control means for generating a shadow image belonging to a character located on a simulated field set in virtual 3D space and extending at least in one direction, the simulated field being rectangular, having first and second sides opposed to each other and a center line which is equidistant from the first and second sides, the image generation control means generating at least one first shadow image belonging to the character and extending toward the first side and at least one second shadow image belonging to the character and extending toward the second side;
density setting means for setting a density of the shadow image based on a position of the character on the simulated field, and the density setting means setting the densities of the first and second shadow images based on the distance between the position of the character and the center line;
display means for displaying the shadow image; and
display control means for displaying the generated shadow image at the set density on the display means.

2. An image generating device, comprising:
shadow image generation control means for generating a shadow image belonging to a character located on a simulated field set in virtual 3D space and extending at least in one direction, the simulated field being rectangular, having first and second sides opposed to each other and a center line which is equidistant from the first and second sides, the image generation control means generating at least one first shadow image belonging to the character and extending toward the first side and at least one second shadow image belonging to the character and extending toward the second side;
density setting means for setting a density of the shadow image based on a position of the character on the simulated field, the density setting means setting the densities of the first and second shadow images based on the distance between the position of the character and the center line, the density setting means reducing the density of the first shadow image as the distance between the position of the character and the center line increases, when the character is located in a specified range between the center line and the first side, while reducing the density of the second shadow image as the distance between the position of the character and the center line increases, when the character is located in the specified range between the center line and the second side;
display means for displaying the shadow image; and
display control means for displaying the generated shadow image at the set density on the display means.

3. The image generating device according to claim 2, wherein the density setting means sets the densities of the first and second shadow images at a fixed level when the character is located with the specified distance from the center line.

4. The image generating device according to claim 2, wherein the density setting means sets the density of the first shadow image at 0 when the character is located within a specified distance from the first side while setting the density of the second shadow image at 0 when the character is located within the specified distance from the second side.

5. The image generating device according to claim 2, further comprising a prohibition control means for prohibiting the generation of the first shadow image when the character is located within a specified distance from the first side while prohibiting the generation of the second shadow image when the character is located within the specified distance from the second side.

6. An image generating device, comprising:
shadow image generation control means for generating a shadow image belonging to a character located on a simulated field set in virtual 3D space, the simulated field being rectangular, having first and second sides opposed to each other and a center line which is equidistant from the first and second sides, said shadow image extending at least in one direction; density setting means for setting a density of the shadow image based on a distance between a position of the character and the center line;

display means for displaying the shadow image; and display control means for displaying the generated shadow image at the set density on the display means.

7. An image generating method comprising the steps of:

generating a shadow image belonging to a character located on a simulated field set in virtual 3D space, the simulated field being rectangular, having first and second sides opposed to each other and a center line which is equidistant from the first and second sides, said shadow image extending at least in one direction;

setting a density of the shadow image based on a distance between a position of the character and the center line; and displaying the generated shadow image at the set density on the display means.

8. A computer readable storage medium storing an image generating program including executable code allowing a computer to perform the steps comprising:

generating a shadow image belonging to a character located on a simulated field set in virtual 3D space, the simulated field being rectangular, having first and second sides opposed to each other and a center line which is eqidistant from the first and second sides, said shadow image extending at least in one direction;

setting a density of the shadow image based on a distance between a position of the character and the center line; and displaying the generated shadow image at the set density on the display means.

9. A video game system, comprising:

an image generating device including:

shadow image generation control means for generating a shadow image belonging to a character located on a simulated field set in virtual 3D space, the simulated field being rectangular, having first and second sides opposed to each other and a center line which is equidistant from the first and second sides, said shadow image extending at least in one direction;

density setting means for setting a density of the shadow image based on a distance between a position of the character and the center line;

display means for displaying the shadow image;

display control means for displaying the generated shadow image at the set density on the display means;

program storage means storing the game program;

operation means for outputting the operation signal corresponding to the external operation; and game progress control means for controlling the position of the character on the simulated field in response to the operation signal in accordance with the game program.

* * * * *